(No Model.)

E. H. BOOTH.
VEHICLE SPRING.

No. 502,605. Patented Aug. 1, 1893.

WITNESSES
Jesse Heller.
Philip C. Masi.

INVENTOR
E. H. Booth,
by E. W. Anderson
his Attorney

UNITED STATES PATENT OFFICE.

EBENEZER H. BOOTH, OF KIRKWOOD, NEW YORK.

VEHICLE-SPRING.

SPECIFICATION forming part of Letters Patent No. 502,605, dated August 1, 1893.

Application filed March 23, 1893. Serial No. 467,337. (No model.)

*To all whom it may concern:*

Be it known that I, EBENEZER H. BOOTH, a citizen of the United States, and a resident of Kirkwood, in the county of Broome and State of New York, have invented certain new and useful Improvements in Vehicle-Springs; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
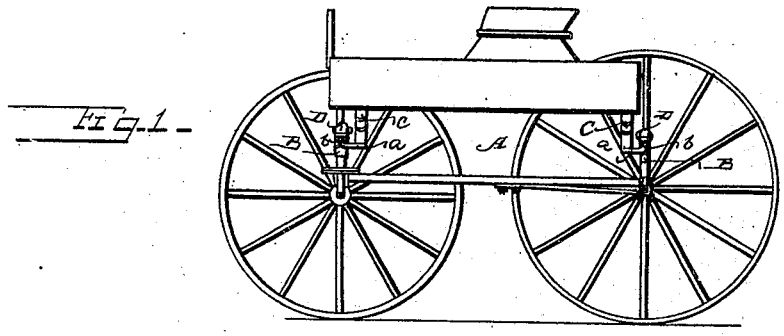
Figure 2:
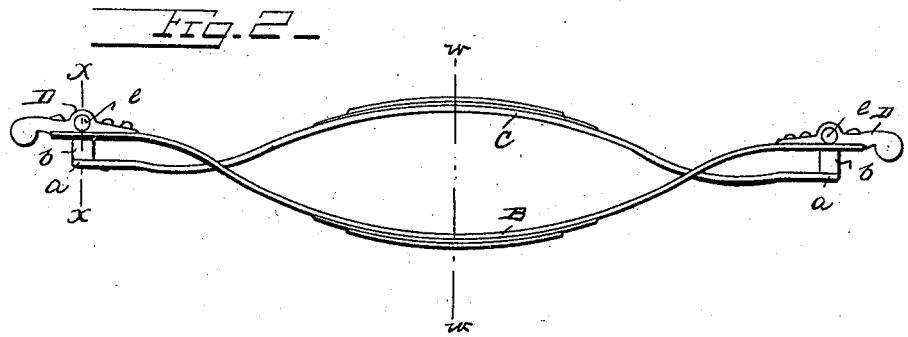
Figure 3:
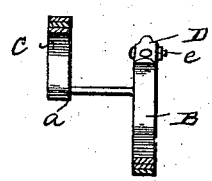
Figure 4:
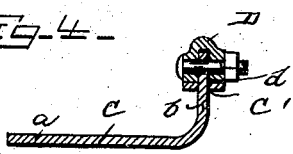
Figure 5:
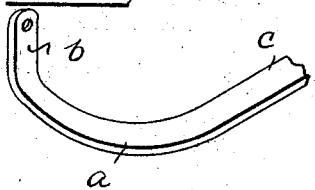

Figure 1 of the drawings is a side view of a vehicle showing the invention applied thereto side wheels being removed. Fig. 2 is a front view of the spring. Fig. 3 is a section on line $w\ w$ Fig. 2. Fig. 4 is a section on line $x\ x$ Fig. 2. Fig. 5 is a detail view of a portion of the spring in modified form.

This invention has relation to certain new and useful improvements in vehicle springs, the object being to provide a spring that can be used on a vehicle without body loops, spring bars, or side bars, thereby greatly reducing both the weight, and cost of the vehicle; and the invention consists in the novel construction and combination of parts, all as hereinafter described and pointed out in the claims.

Referring to the accompanying drawings, the letter A designates the running gear of a vehicle to which my improved springs are applied, one at both front and rear. Said springs consist each of a half spring B, which is bolted or otherwise secured to the axle or bolster of the running gear, and a second spring C, secured to the body and on which the latter is supported. Both of said springs are made up of one or more flat curved plates, according to the strength desired. The spring C is curved downwardly from the center toward each end, and its end portions $a$, $a$ are bent toward the section B, and terminate each in an upward bend $b$, which enters an elongated slot C' in the bed plate of B, and into a slot $d$, and into a slotted or recessed lug or block D on said plate. Said upwardly turned ends $b$ are secured in said slots by means of pivot bolts $e$, $e$, through said lug or block. The bent portions $a\ a$ of the spring C may be of any desired length in order to bring said spring at any desired point under the body of the vehicle, the position or location of the spring being designed to be changed according to the character of the vehicle to which it is applied. The pivotal connection between the two parts of the spring relieves them from any unnatural strain when loaded. The lug or block D may be integral with the bed plate of the spring B, or it may be a separate piece, as shown, and be attached to said plate by bolts or screws.

Having thus described this invention, what I claim as new, and desire to secure by Letters Patent, is—

1. In a vehicle spring, the combination with a section B, having slots in its end portions, of a section C placed farther underneath the vehicle body than is the section B, said section C having horizontally bent end portions engaging said slots, and loosely secured therein, substantially as specified.

2. The combination with the spring B having the slots at its end portions, and the lug or block secured to said spring over said slots, and also slotted or recessed, of the spring C having the bent ends loosely engaging said slots and secured therein by a pivot bolt or pin, substantially as specified.

In testimony whereof I affix my signature in presence of two witnesses.

EBENEZER H. BOOTH.

Witnesses:
S. B. BALL,
J. C. BOOTH.